United States Patent Office 2,978,517
Patented Apr. 4, 1961

2,978,517
BIS-(ALPHAHALOTOLYL) ALKANES

Arthur M. Schiller, New Canaan, Conn., assignor to American Cyanamid Company, New York, N.Y., a corporation of Maine No Drawing. Filed Jan. 14, 1959, Ser. No. 786,708

3 Claims. (Cl. 260—649)

This invention relates to bis-(alphahalotolyl) alkanes and more particularly to compounds of this type in which the alphahalotolyl groups are attached to an intermediate carbon atom of a hydrocarbon chain containing from 3 to 9 carbon atoms. These compounds are described accurately by the formula

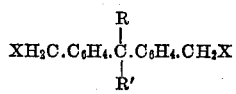

in which R and R' are alkyl hydrocarbon radicals of from 1 to 4 carbon atoms and X is halogen; i.e., a chlorine, bromine, iodine or fluorine atom. The invention includes the new compounds themselves and their methods of preparation as hereinafter described.

The compounds of the invention are particularly well suited for oxidation to the corresponding alkylidene dibenzoic acids which are important reagents for the production of improved alkyd resins as is shown in U.S. Patent No. 2,851,432 dated September 9, 1958. They can also be converted to bis-benzyl alcohols which can be used as alcoholic resin-forming ingredients by esterification with the above and other organic dicarboxylic acids such as phthalic anhydride, maleic anhydride and the like.

The novel alkylidene bis-benzyl halides of the invention can be prepared by direct halogenation of the corresponding ditolylalkanes with chlorine, bromine, iodine or fluorine while suspended in a suitable solvent such as carbon tetrachloride and in the presence of actinic light. Other halogenating agents such as N-bromosuccinimide may also be used if desired. The preparation of compounds representative of the invention is described in the following examples to which, however, the invention in its broader aspects is not limited.

Example 1

To a solution of 119 grams of 2,2-di-(p-tolyl) butane in 500 ml. of carbon tetrachloride there are added 196 grams of N-bromosuccinimide and the mixture is refluxed for 5 hours. It is then filtered and the filtrate is decolorized with activated charcoal. The solvent is removed by distillation and the product is recrystallized from hexane. There are obtained 96 grams of 2,2-bis-(alphabromotolyl) butane which after two additional recrystallizations has a melting point of 77°–78° C.

Example 2

A three-necked glass flask equipped with a gas inlet tube and illuminated by an electric light bulb is charged with 119 grams of 2,2-di-(p-tolyl) butane. The charge is heated to 150° C. and chlorine gas is bubbled through at this temperature until a weight increase of 35 grams is obtained. The resulting 2,2-bis-(alphachlorotolyl) butane is a light yellow oil which does not crystallize readily.

Example 3

A solution of 112 grams of 2,2-di-(o-tolyl) propane and 196 grams of N-bromosuccinimide in 500 ml. of carbon tetrachloride was heated to boiling and refluxed for 5 hours, cooled and the succinimide formed was removed by filtration. The solution was decolorized by shaking with activated charcoal and was then evaporated on a steam bath. The residue was taken up in 50 ml. of hexane and crystallized at 0°–5° C. The resulting purified 2,2'-propylidene dibenzylbromide weighed 92 grams.

Example 4

An autoclave is charged with 112 parts by weight of 1,1-di-(p-tolyl) propane, 5 parts of metallic sodium and 1.4 parts of o-chlorotoluene, purged with nitrogen gas and sealed. It is then heated to 170° C., the pressure is released, and 12 parts of ethylene are introduced under a pressure of 900 p.s.i. The temperature is then maintained at 170° C. with intermittent addition of ethylene for about 6 hours or until no more ethylene is consumed. The reaction products are filtered, washed with hexane, and the filtrates are distilled. The principal product is 3,3-di-(p-tolyl) pentane, a viscous liquid boiling at 213°–220° C. at 15 mm. of mercury.

The preparation of 2,2-ditolylpentane, 2,2-, 3,3- and 4,4-ditolylheptanes and other hydrocarbons of the formula

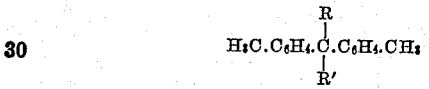

in which R and R' are alkyl radicals of from 1 to 4 carbon atoms is further described in U.S. Patent No. 2,848,486. Any of these hydrocarbons can be reacted with N-bromosuccinimide by the procedures of Examples 1 and 3 or with chlorine, fluorine or iodine by the procedure of Example 2 to form the corresponding dihaloditolylalkanes of the present invention.

Example 5

A portion of the product of Example 1 weighing 19.8 grams is suspended in 72 grams of water and heated with stirring until gentle refluxing begins. Nitric acid of 70% concentration is then slowly added until 200 grams have been introduced during 90 minutes. Stirring and refluxing are continued for an additional 2.5 hours after completion of the nitric acid addition. The resulting crude 2,2-butylidene bis-(benzoic acid) is then recovered by filtration, washed three times with hot water and dried. The yield is 14 grams, which is better than 90% of theory.

What I claim is:

1. A dihalotolylalkane of the formula

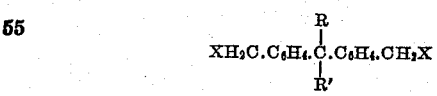

in which X is halogen and R and R' are alkyl hydrocarbon groups of 1 to 4 carbon atoms.

2. The compound: 2,2-bis-(alphabromotolyl) butane.

3. The compound: 2,2-bis-(alphachlorotolyl) butane.

References Cited in the file of this patent

FOREIGN PATENTS 491,019     Canada _____ Mar. 3, 1953

OTHER REFERENCES

Steinberg: Journal American Chemical Society, 74, 5388–5399 (1952).

Cram et al.: Journal American Chemical Society, 73, 5691–5704 (1951).

Maquin et al.: Chemical Abstracts, 49, 975e (1954).